No. 772,233. PATENTED OCT. 11, 1904.
J. HAIR.
WHIFFLETREE.
APPLICATION FILED JUNE 7, 1901.
NO MODEL.

Witnesses,
John Cunningham
Walter Searle

Inventor.
James Hair

No. 772,233.        Patented October 11, 1904.

UNITED STATES PATENT OFFICE.

JAMES HAIR, OF OAMARU, NEW ZEALAND.

WHIFFLETREE.

SPECIFICATION forming part of Letters Patent No. 772,233, dated October 11, 1904.

Application filed June 7, 1901. Serial No. 63,629. (No model.)

*To all whom it may concern:*

Be it known that I, JAMES HAIR, a subject of the King of Great Britain, residing in Tyne street, Oamaru, New Zealand, have invented new and useful Improvements in Whiffletrees, of which the following is a specification.

This invention relates to improvements in whiffletrees, and has for its object to provide improved means for attaching and locking the traces to the ends thereof.

According to the invention each end of the whiffletree is provided with a sliding pin, having a spring by means of which it is normally caused to project from the end of the whiffletree, and in conjunction with the said pin there is arranged a bracket or eye, preferably of metal, having a hole or bearing into which the end of the aforesaid pin enters when held in its outermost position under the action of the spring. A thumb-piece or the like is fitted to the pin to enable it to be withdrawn from the bearing or hole in the eye when desired to attach or detach a trace end.

Figure 1:
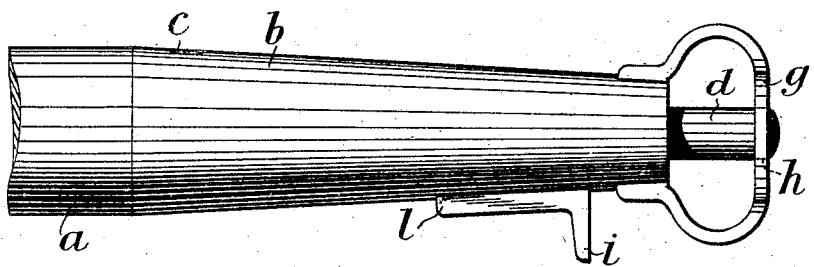
Figure 2:
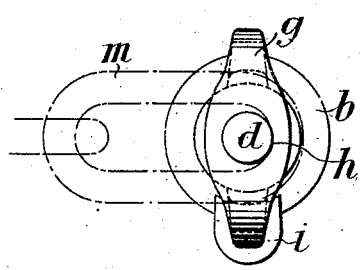
Figure 3:
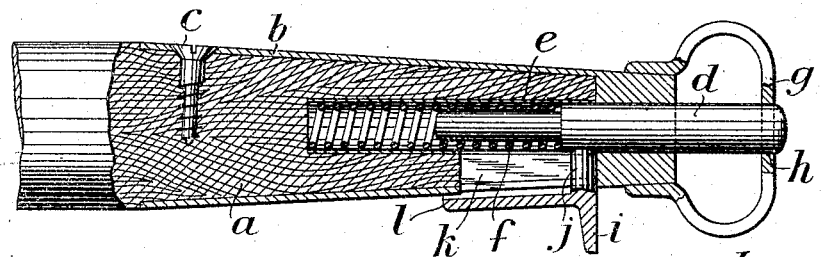

In the accompanying drawings, Figure 1 is a side elevation of a whiffletree end having the improved attachment applied thereto. Fig. 2 is an end elevation showing the trace-eye attached, and Fig. 3 is a longitudinal sectional elevation of the whiffletree end and attachment.

*a* is the end of the whiffletree, the said end being tapered and provided with a metal socket *b*, suitably secured thereto—for example, by the screw *c*.
*d* is the sliding pin, which is held in a central recess or socket *e* in the end of the whiffletree, and *f* is the spring by means of which it is normally caused to project from the said end.
*g* is the bracket or eye, which is formed of metal and is secured to the end of the metal socket *b* at two different points, said bracket being provided at its front end with the hole or bearing *h*, into which the end of the pin *d* enters when pressed outward under the action of the spring.

*i* is the thumb-piece, which has a stem *j* engaging a slot *k* in the socket *b* and whiffletree end *a* and secured to the sliding pin *d*. By means of this thumb-piece the said pin can be withdrawn into the whiffletree end against the action of the spring *f*. A guard *l* is provided on the thumb-piece to cover the slot in the whiffletree end when the pin is in its outermost position, as clearly shown in the drawings. The guard *l*, thumb-piece *i*, and stem *j* are all made in one piece, as clearly shown in the drawings.

With this arrangement to attach a trace to the whiffletree the pin *d* is withdrawn from the hole *h* in the bracket *g* against the action of the spring *f*. The link or eye *m*, Fig. 2, at the end of the trace is then placed within the bracket *g* and the thumb-piece *i* released, so as to allow the pin *d* to spring outward through the trace-eye *m* and into the hole or bearing *h* in the bracket *g*, thus securely attaching the trace to the whiffletree. To detach the trace, it will obviously only be necessary to withdraw the pin *d* against the action of the spring *f* by means of the thumb-piece *i*.

Having now particularly described and ascertained the nature of my said invention and in what manner the same is to be performed, I declare that what I claim is—

The attachment for whiffletrees comprising the socket, the bracket secured to the socket at two different points, the pin sliding in a recess in the end of the whiffletree and the end of the socket and engaging the hole in the bracket, the spring for holding the pin in engagement with the hole in the bracket, and the thumb-piece, guard and stem formed in one piece and secured to said pin, substantially as described.

JAMES HAIR.

Witnesses:
JOHN CUNNINGHAM,
WALTER SEARLE.